M. A. GIBBONS.
PNEUMATIC TIRE.
APPLICATION FILED MAR. 1, 1915.
1,190,144.
Patented July 4, 1916.
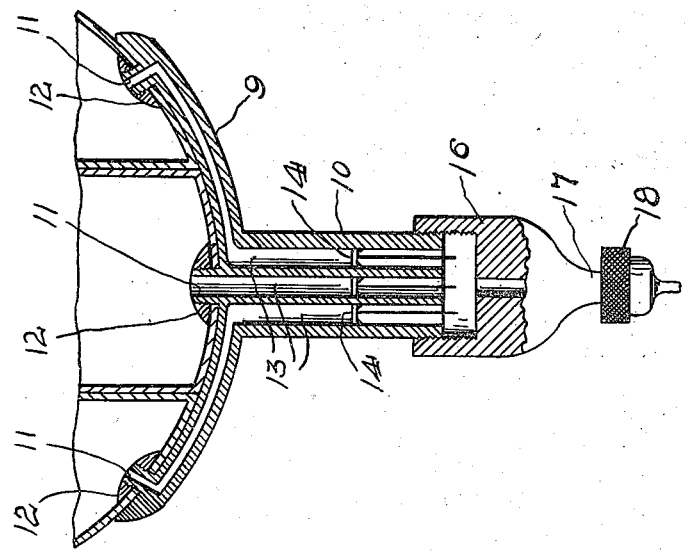
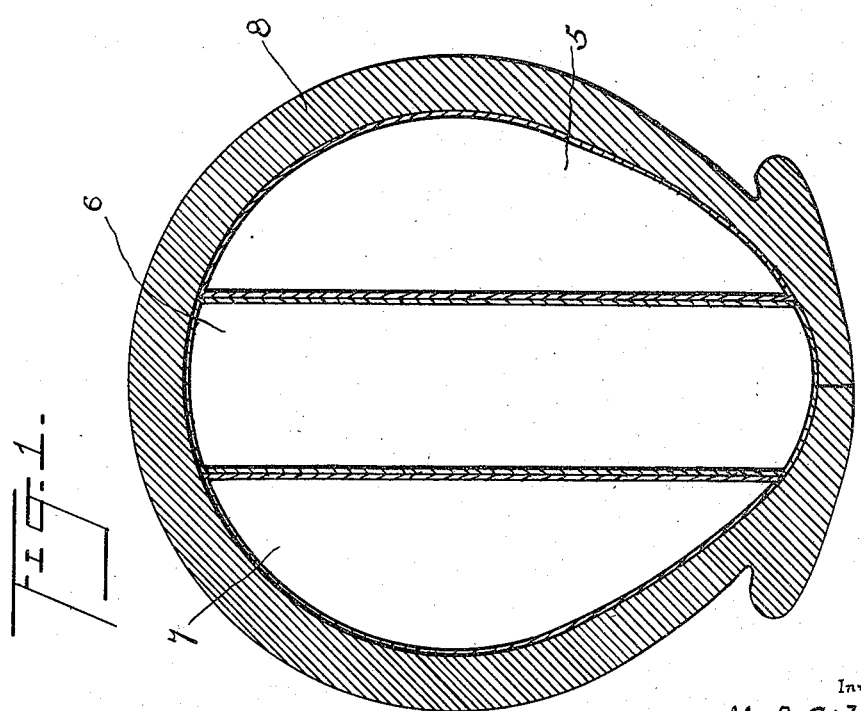
Witnesses
R. F. Veihmeyer.
J. F. Byrne
Inventor.
M. A. Gibbons.
Attorney.

UNITED STATES PATENT OFFICE.

MARY A. GIBBONS, OF DES MOINES, IOWA.

PNEUMATIC TIRE.

1,190,144.  Specification of Letters Patent.  Patented July 4, 1916.

Application filed March 1, 1915. Serial No. 11,290.

*To all whom it may concern:*

Be it known that I, MARY A. GIBBONS, a citizen of the United States, residing at Des Moines, in the county of Polk and State of Iowa, have invented certain new and useful Improvements in Pneumatic Tires; and I do hereby declare the following to be a full, clear, and exact description of the invention, such as will enable others skilled in the art to which it appertains to make and use the same.

This invention relates to pneumatic tires, and more particularly to the inner tube ordinarily used in automobile tires.

The invention has for its object to provide an inner tube composed of a plurality of independently inflatable sections, whereby when one section is punctured the air remaining within the other sections will sustain the weight of the vehicle and prevent serious injury to the tires and discomfiture to the occupants of the vehicle.

Another object is the provision of means attachable to a tire pump whereby the several sections composing the inner tube may be inflated.

With these and other objects in view, the invention consists in the novel construction, arrangement and formation of parts as will be hereinafter specifically described, claimed and illustrated in the accompanying drawing, in which:

Figure 1 represents a transverse sectional view through a tire constructed in accordance with this invention, and Fig. 2 represents a fragmental detail sectional view through the attaching plate and valves for controlling the escape of air from the inner tube sections.

Referring to the drawing in detail, wherein similar reference numerals designate corresponding parts throughout the several views, the numerals 5, 6 and 7 indicate the sections, preferably three in number, composing the inner tube, which when properly assembled, as illustrated in Fig. 1, are of the ordinary shape of an inner tube. The sections 5, 6 and 7 are of annular or endless and hollow formation and are preferably formed of rubber or other similar elastic material. The sectional inner tube is placed within an outer casing 8, as usual, and the casing 8 is adapted to be secured upon the rim of the motor vehicle.

A curved plate 9 is shaped conformably with the rim of a wheel (not shown) and carries an integral extension 10 projecting radially from the convex face thereof, and the extension 10 is adapted to be secured in the valve stem receiving opening provided in the rim of the wheel to which the tire is to be attached. The concave side of the plate 9 is formed with a plurality of hollow projections or extensions 11 corresponding in number to the number of tube sections 5, 6 and 7 and having external screwthreads on which are fitted nuts 12.

The extension 10 of the plate 9 is formed with a plurality of parallel bores or passages 13 corresponding in number to the number of tube sections and each communicating with one of the hollow extensions 11 of the concave face of the plate 9. The preferred type of check valves 14 are arranged adjacent the outer extremities of the passages 13 for preventing the escape of air from the several tube sections. The stems 15 of the valves project interiorly of the extension 10, whereby the valves 14 may be opened when desired to exhaust the air from the sections.

Each section 5, 6 and 7 is formed with an opening through which is positioned one of the hollow extensions 11 and said sections are secured in position against said plate and over the extensions by the nuts 12. A sleeve 16 is threaded on the outer extremity of the extension 10 and is provided with a reduced threaded extension 17 to which is adapted to be attached a pump for inflating the sections 5, 6 and 7. A suitable cap 18 is removably secured over the reduced extremities 17 of the sleeve 16 for preventing dust and the like from entering the bore of said sleeve and the several passages 13.

In use, the several sections of the tube are inflated by a suitable pump attached to the reduced extremity 17 of the sleeve 16, and it is clearly evident that should one of the sections become punctured the air remaining within the several other sections will sustain the weight of the vehicle and prevent rim-cutting or other injury to the casing 8. As clearly illustrated in Fig. 1, the several inner tube sections 5, 6 and 7 are of approximately the same cross sectional area and thus the pneumatic pressure exerted by the air contained in the several sections against the inner surface of the tread portion of the tire is substantially equal. Should it be desired to exhaust the air from any one or all of the sections the sleeve 16 is removed from the hollow extension 10 and access may then be had to the several valve stems 15 controlling the flow of air through the passages 13.

What I claim is:

A pneumatic tire comprising an outer casing, an inner and a pair of outer annular tubes positioned within the casing, a curved plate engaging each of the tubes, an extension formed on said plate intermediate its ends and centrally of the inner tubes, said plate provided with oppositely extending passages extending from points adjacent the ends of the plate and terminating throughout the extension, projections formed on the plate adjacent each end thereof and extending into the outer tubes, nuts positioned on the projections for clamping the outer tubes to the plate, said projections provided with passages therein and in communication with the passages of the plate, a projection formed intermediate the ends of the plate and extending through the inner tube, a nut on last mentioned extension for clamping the inner tube to the plate, said last mentioned projection provided with a passage and extending through the extension and intermediate the first mentioned passages of the extension, check valves mounted in the passages of the extension, and a sleeve provided with a recess and threaded to the extension and provided with a reduced portion having a passage in communication with the recess for filling the tubes with air simultaneously.

In testimony whereof I affix my signature in presence of two witnesses.

MARY A. GIBBONS.

Witnesses:
C. W. LYON,
S. L. GEORGE.